(12) United States Patent
Blase et al.

(10) Patent No.: US 9,132,959 B2
(45) Date of Patent: Sep. 15, 2015

(54) ENDLESSLY CIRCULATING LINK CONVEYOR WITH ENERGY SUPPLY

(75) Inventors: Frank Blase, Bergisch (DE); Andreas Hermey, Hennef (DE)

(73) Assignee: Igus GmbH, Cologne (DE)

( * ) Notice: Subject to any disclaimer, the term of this patent is extended or adjusted under 35 U.S.C. 154(b) by 390 days.

(21) Appl. No.: 13/694,113

(22) PCT Filed: Apr. 27, 2011

(86) PCT No.: PCT/EP2011/056646
§ 371 (c)(1),
(2), (4) Date: Nov. 4, 2013

(87) PCT Pub. No.: WO2011/134991
PCT Pub. Date: Nov. 3, 2011

(65) Prior Publication Data
US 2014/0151199 A1 Jun. 5, 2014

(30) Foreign Application Priority Data
Apr. 29, 2010 (DE) ..................... 20 2010 006 220 U

(51) Int. Cl.
*F16G 13/16* (2006.01)
*H02G 11/00* (2006.01)
(Continued)

(52) U.S. Cl.
CPC ................ *B65G 15/30* (2013.01); *F16G 13/16* (2013.01); *H02G 3/0475* (2013.01); *H02G 11/006* (2013.01)

(58) Field of Classification Search
USPC ................ 198/832, 850, 851, 852; 191/12 R; 439/162
See application file for complete search history.

(56) References Cited

U.S. PATENT DOCUMENTS 2,967,568 A * 1/1961 Friday ........................... 162/407
3,275,165 A * 9/1966 Vedvik ........................... 414/627
(Continued)

FOREIGN PATENT DOCUMENTS

DE 970361 C 9/1958
DE 8200741 U1 6/1982
(Continued)

OTHER PUBLICATIONS

PCT International Search Report mailed Jul. 20, 2011, received in corresponding PCT Application No. PCT/EP2011/056646, 2 pgs.
(Continued)

*Primary Examiner* — Douglas Hess
(74) *Attorney, Agent, or Firm* — Grossman Tucker Perreault & Pfleger, PLLC

(57) ABSTRACT

An endlessly circulating link conveyor with energy supply from a stationary source comprises a plurality of links (1) that are connected to one another such that they can pivot with respect to one another, jointly form a link conveyor that follows a running path over deflection rollers (6) and can be driven in circulating fashion, an energy guiding chain (30), one end of which travels with the link conveyor and the other end of which is arranged in rotating fashion within the circulatory path, and via which the link conveyor can be connected to supply lines (36), where the links (1) of the link conveyor display a channel (2) for receiving distribution lines (40) and, laterally next to the channel, a guide groove (3) for guiding the energy guiding chain (30), where the upper face of at least one of the links (1) displays a mounting surface for consumers, and one of the links (1) is equipped for connecting the travelling end (32) of the energy guiding chain (30).

10 Claims, 6 Drawing Sheets

(51) Int. Cl.
*B65G 15/30* (2006.01)
*H02G 3/04* (2006.01)

(56) References Cited

U.S. PATENT DOCUMENTS

| | | | | |
|---|---|---|---|---|
| 3,794,151 | A * | 2/1974 | Feasey | 198/803.5 |
| 4,163,591 | A | 8/1979 | Hennig et al. | |
| 4,564,241 | A * | 1/1986 | Holz et al. | 299/43 |
| 4,988,838 | A * | 1/1991 | Kirtland | 191/12 C |
| 5,058,721 | A * | 10/1991 | Koibuchi | 198/345.1 |
| 5,593,010 | A | 1/1997 | Willing et al. | |
| 5,692,984 | A | 12/1997 | Kayatani et al. | |
| 6,176,072 | B1 * | 1/2001 | Weber | 59/78.1 |
| 7,047,720 | B2 * | 5/2006 | Ikeda et al. | 59/78.1 |
| 7,493,750 | B2 * | 2/2009 | Komiya | 59/78.1 |
| 7,617,669 | B1 * | 11/2009 | Komiya et al. | 59/78.1 |
| 7,669,402 | B2 * | 3/2010 | Blase | 59/78.1 |
| 7,802,666 | B2 * | 9/2010 | Maino | 191/12 R |
| 8,397,479 | B2 * | 3/2013 | Wendig et al. | 59/78.1 |
| 8,561,949 | B2 * | 10/2013 | Komiya et al. | 248/73 |
| 2002/0043591 | A1 | 4/2002 | Sakai et al. | |
| 2010/0276257 | A1 | 11/2010 | Polman | |

FOREIGN PATENT DOCUMENTS

| | | |
|---|---|---|
| DE | 4321465 A1 | 12/1994 |
| DE | 10214554 A1 | 10/2003 |
| DE | 10301205 A1 | 7/2004 |
| DE | 10315627 A1 | 11/2004 |
| EP | 693638 A1 | 1/1996 |
| EP | 875695 A1 | 11/1998 |

OTHER PUBLICATIONS

PCT Translation of International Preliminary Report on Patentability mailed Nov. 8, 2012, received in corresponding PCT Application No. PCT/EP2011/056646, 8 pgs.

* cited by examiner

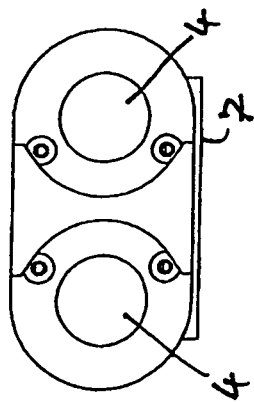
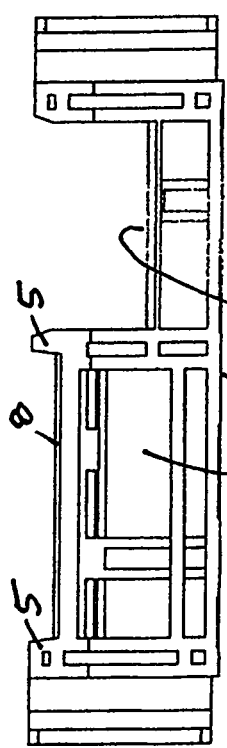
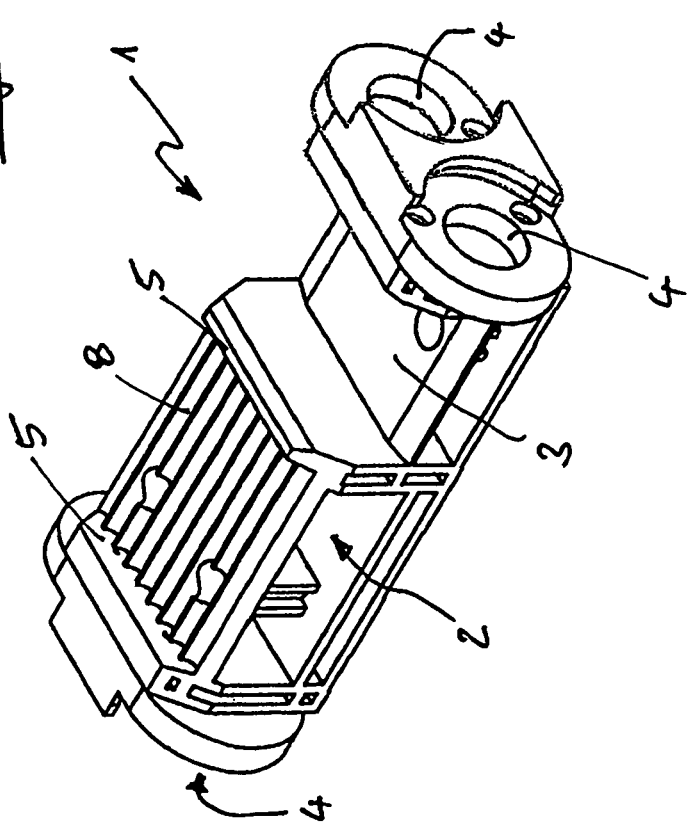

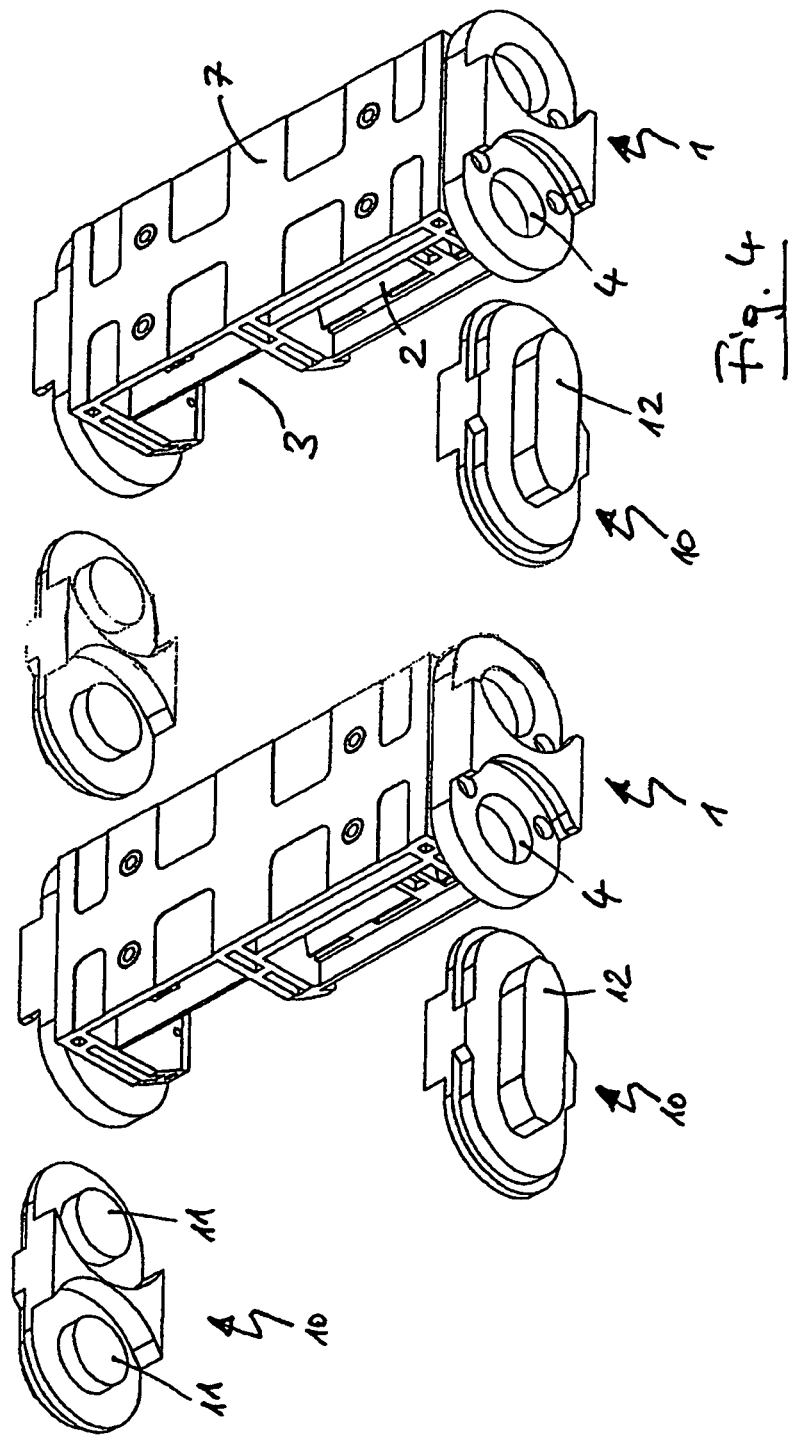

ENDLESSLY CIRCULATING LINK CONVEYOR WITH ENERGY SUPPLY

The present invention relates to an endlessly circulating link conveyor with energy supply via an energy guiding chain, and a conveyor element for creating a link conveyor of this kind.

It is known practice to equip circulating (endless) conveyor belts with consumers that are supplied with gaseous or liquid media or a vacuum, electrical energy and/or control signals for the consumers by supply lines integrated in the conveyor belt. Examples of the consumers used include grippers or suction lips for picking up, transporting and setting down objects at a different point for assembly purposes, possibly with additional automatic processing machines.

It is known from DE 103 01 205 A1 that consumers mounted on endlessly circulating conveyor belts can be supplied by means of an energy guiding chain, into the stationary end of which, which is arranged in rotating fashion within the circulatory path, supply lines are introduced, where the other end of the energy guiding chain travels with the conveyor belt, from where the supply lines are transferred to the conveyor belt.

The object of the invention is to create an integrated system, comprising circulating conveyor belt and energy supply from a stationary source, that is easy to assemble, variable in terms of the circulating length and retrofitting of additional supply lines, and can be constructed in the form of a modular system.

The object is solved in accordance with the enclosed independent claims. The dependent claims relate to advantageous embodiments of the invention.

According to the invention, the conveyor belt is designed as a link conveyor, where the links display a channel for receiving distribution supply lines and, alongside it, a guide groove for the energy guiding chain. At least one link of the conveyor displays, on the side pointing away from the guide groove, which faces outwards relative to the circulatory path of the conveyor belt, a mounting plate for mounting consumers. All links are preferably identical, such that consumers can be installed on every link of the conveyor. The links are preferably of one-piece design. Furthermore, the links display hinge pins and/or hinge mounts at the front and rear in the direction of travel of the conveyor belt.

The links can be connected to form the conveyor via separate connecting elements that display complementary hinge mounts and/or hinge pins and engage the hinge pins and/or hinge mounts of the links.

However, the links of the conveyor can also be designed in such a way that two links are directly connected in articulated fashion via hinge pins of the one link that engage hinge mounts of the other link.

The running path of the link chain is defined by at least two deflection rollers, between which the link chain is stretched in linear fashion. The width of the deflection rollers does not exceed the width of the channel, meaning that the space within the circulatory path remains free on the side on which the guide groove for the energy guiding chain is located. The side walls of the channel can preferably display projections that reach around the deflection rollers for lateral guidance of the link conveyor. The side of the links facing towards the deflection roller can moreover display a tooth structure, oriented transversely to the direction of circulation, that can be engaged by a complementary tooth structure of a driving mechanism for driving the link conveyor. The driving mechanism can be a rotary drive for one of the deflection rollers, where the complementary tooth structure is provided on the rolling surface of the deflection roller. On the other hand, a separate drive can also be provided by means of toothed rings, or by a driven toothed belt that is located between the deflection rollers and displays the complementary tooth structure on its outer side.

The non-travelling end of the energy guiding chain is mounted centrally within the circulatory path in swivelling fashion. Supply lines for the consumers are introduced on the non-travelling end of the energy guiding chain via a rotary connection that is preferably coaxial with the swivelling axis.

The other end of the energy guiding chain is connected to one of the links of the link conveyor, such that it travels with the circulating link conveyor. It is here that the supply lines are led out of the energy guiding chain, introduced into the channel of the link and connected to the distribution lines. Provision can also be made for the means for connecting the supply lines to be mounted on the mounting plate of a link.

At least the lower strand of the energy guiding chain is supported and laterally guided in the guide groove formed by the string of links of the link conveyor. Depending on the radius of the deflection zone of the energy guiding chain, which is defined by corresponding limitations of the pivoting capacity of the chain links relative to each other, the upper strand is likewise laterally guided by the guide groove of the link conveyor. The radius of the deflection zone of the energy guiding chain is preferably selected in such a way that both the lower strand and the upper strand of the chain are guided in the guide groove.

The link conveyor is preferably guided in guide grooves laterally reaching around the link conveyor, at least between the deflection rollers. To this end, projections that engage the guide grooves can be provided laterally on the links and/or the connecting elements.

An example of the invention is explained below on the basis of the enclosed Figures, where identical reference numbers in different Figures denote functionally identical elements.

FIG. 1 shows a perspective view of a link of the link conveyor according to the invention, from below;

FIG. 2 shows a view of the link according to FIG. 1, transverse to the longitudinal extension of the link conveyor;

FIG. 3 shows a view of the link according to FIG. 1, parallel to the longitudinal extension of the link conveyor;

FIG. 4 shows a perspective view of two adjacent links with connecting elements, from above;

Figure 8:
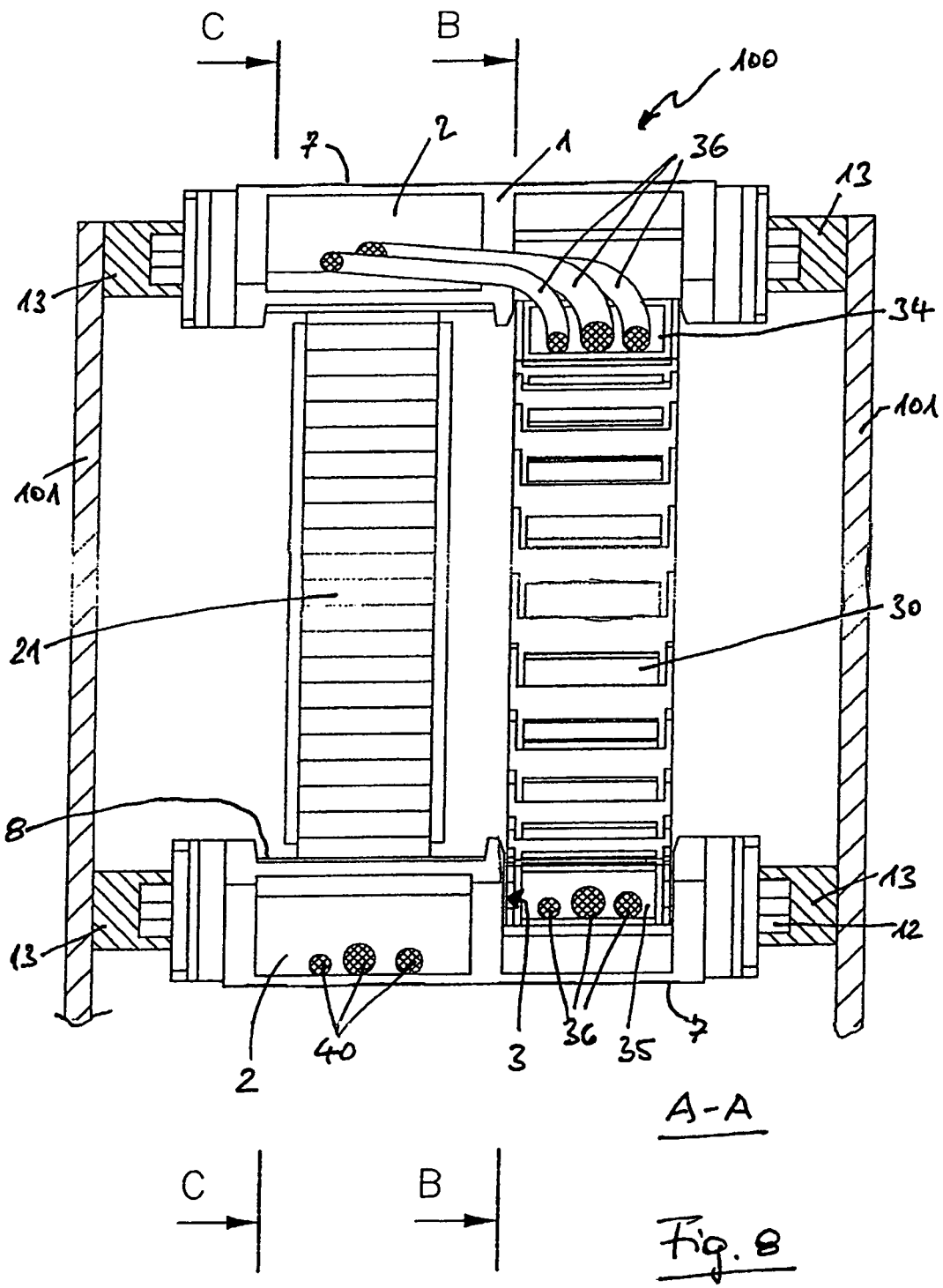
FIG. 8 shows an enlarged cross-section A-A from FIG. 10*d* of a link conveyor arrangement according to the invention.
Figure 10A:
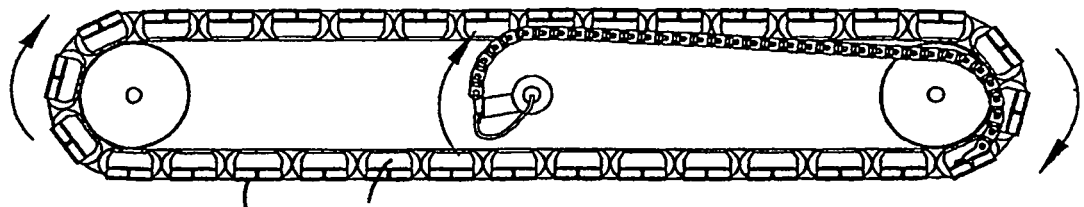
Figure 10B:
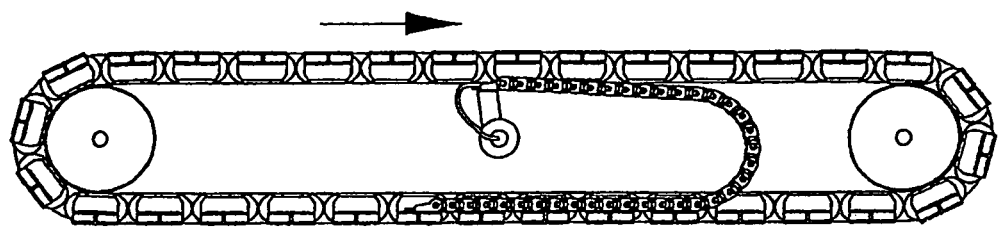
Figure 10C:
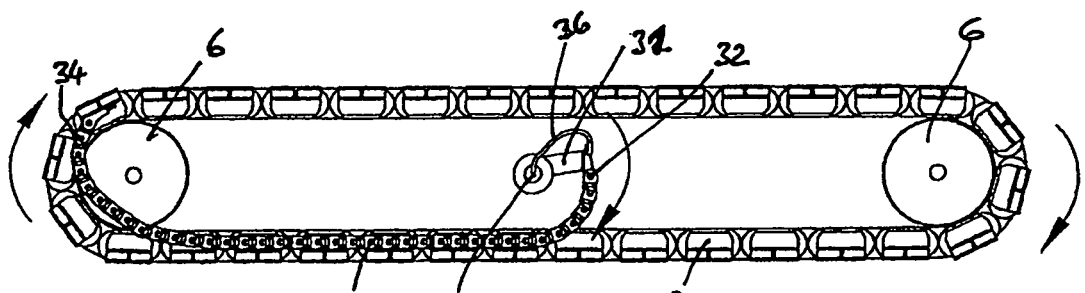
Figure 10D:
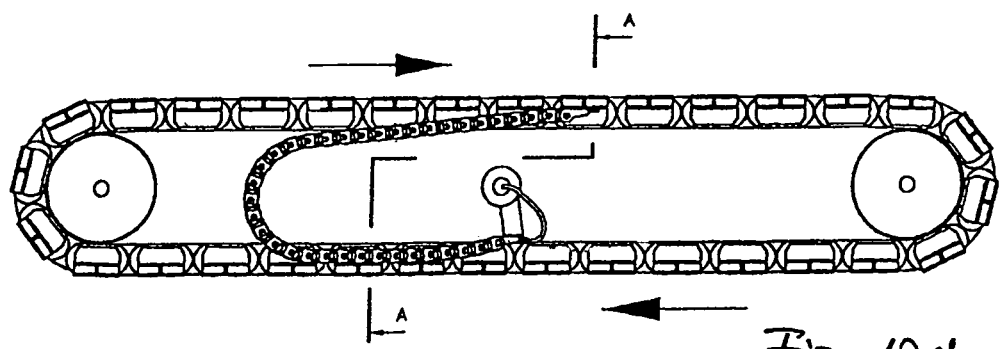

FIG. 10*a* shows a reduced cross-section B-B from FIG. 8;

FIGS. 10*b*, *c* and *d* show, together with FIG. 10*a*, different circulating phases of the link conveyor arrangement according to the invention.

As can be seen from FIGS. 1, 2 and 3, the link of link conveyor 1 displays a channel 2, extending in the longitudinal direction, a guide groove 3, arranged laterally next to channel 2, lateral hinge mounts 4, guide webs 5 for guiding the link conveyor on deflection roller 6 (FIG. 9), a mounting plate 7 and, below channel 2, a toothed structure 8, extending in the transverse direction, for engaging by a drive unit.

FIG. 4 shows two links 1 and four connecting elements 10. The connecting elements display pivot pins 11 that, following assembly, engage hinge mounts 4 and connect links 1 in articulated fashion. Outward-pointing projections 12 serve to guide the link conveyor in guide grooves 13 (FIG. 8).

Figure 5:
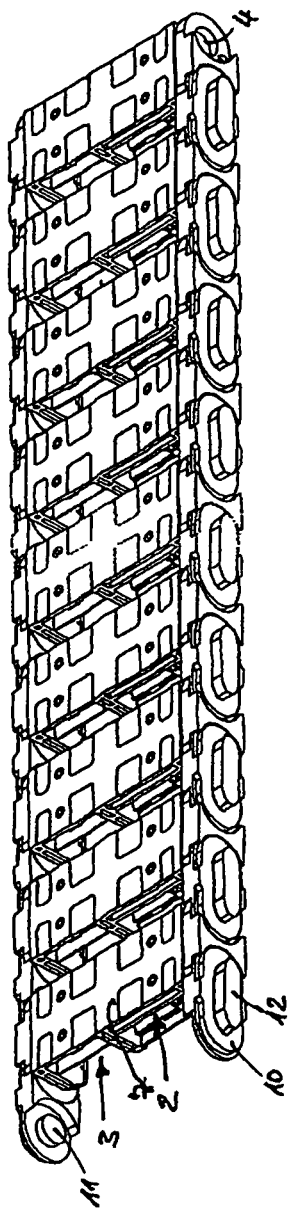
FIG. 5 shows a perspective view of a section of the link conveyor, from above.
Figure 6:
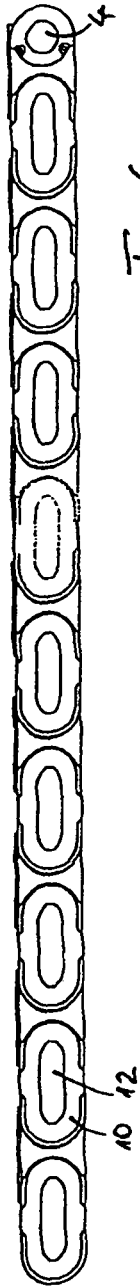
FIG. 6 shows a side view according to FIG. 5.
Figure 7:
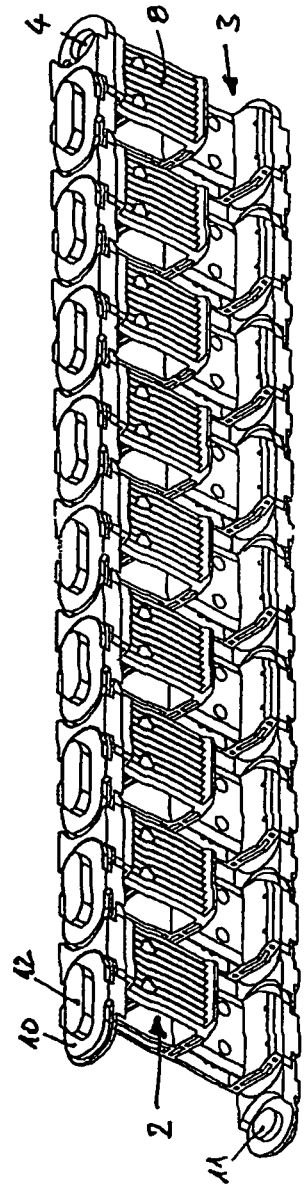
FIG. 7 shows a perspective view according to FIG. 5, from below.

FIGS. 5, 6 and 7 show a section of a link conveyor according to the invention, assembled from links 1 and connecting elements 10.

Figure 9:
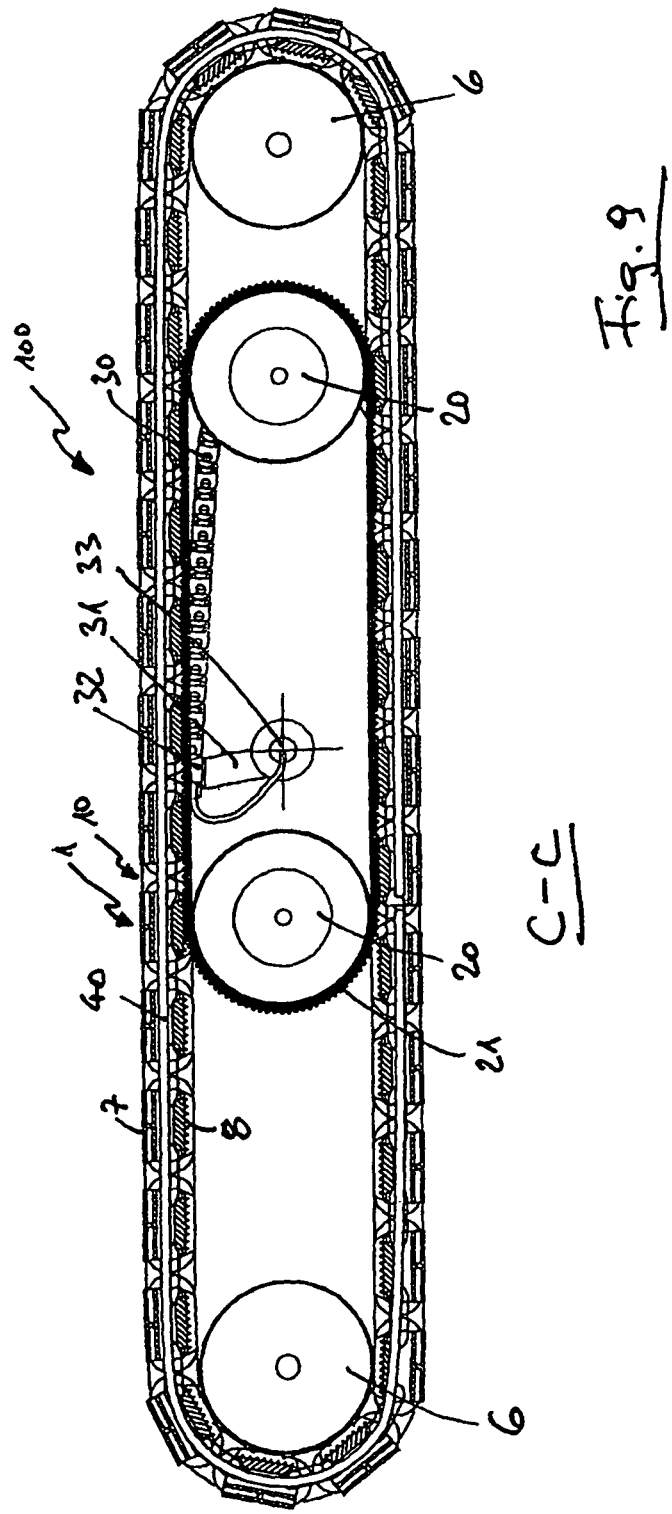
FIG. 9 shows a reduced cross-section C-C from FIG. 8.

FIG. 9, illustrating cross-section C-C from FIG. 8, shows link conveyor arrangement 100 according to the invention, with the endless link conveyor that is guided over deflection rollers 6, consists of a plurality of links 1 and is driven via drive wheels 20, one of which is driven, by means of toothed belt 21, the teeth of which engage tooth structure 8 of links 1. Moreover shown in the background are energy guiding chain 30, whose non-travelling end 32 is mounted in rotating fashion about axis 33 via lever 31, as well as distribution line 40, which runs within channel 2.

It can be seen from the cross-sectional drawing in FIG. 8, which represents section A-A from FIG. 10a, that link conveyor arrangement 100 is located in a frame or housing 101. Fastened on the frame are guide rails 13, which are engaged by projections 12 of connecting element 10. Distribution lines 40 run in channel 2 of link 1, shown as a cross-section at the bottom. To the right alongside toothed belt 21 runs energy guiding chain 30, which consists of a plurality of chain links that are connected to each other in articulated fashion and together form a channel for receiving the supply lines. Energy guiding chain 30 is guided in guide groove 3, formed by the links of the conveyor. Visible in lower chain link 35, shown as a cross-section, are supply lines 36, which are led out of energy guiding chain 30 at upper chain link 34, shown as a cross-section, and transferred to the channel of adjacent link 1 of the link conveyor. Chain link 34 is connected to the adjacent link of the link conveyor and travels with it.

Finally, FIGS. 10a, b, c and d show different, consecutive phases of the circulation of link conveyor and energy guiding chain, where the arrows indicate the direction of circulation.

The invention claimed is:

1. Endlessly circulating link conveyor with energy supply from a stationary source, comprising
    a plurality of links that are connected to one another such that they can pivot with respect to one another, jointly form a link conveyor that follows a running path over deflection rollers and can be driven in circulating fashion,
    an energy guiding chain, one end of which travels with the link conveyor and the other end of which is arranged in rotating fashion within the circulatory path, and via which the link conveyor can be connected to supply lines,
    where the links of the link conveyor display a channel for receiving distribution lines and,
    laterally next to the channel, a guide groove for guiding the energy guiding chain, where
the upper face of at least one of the links displays a mounting surface for consumers, and
    one of the links is equipped for connecting the travelling end of the energy guiding chain.

2. Link conveyor according to claim 1, where connecting elements for articulated connection of pairs of adjacent links are provided, engaging corresponding hinge mounts of the links by means of pivot pins.

3. Link conveyor according to claim 1, where connecting elements for articulated connection of pairs of adjacent links are provided, displaying hinge mounts that are engaged by corresponding pivot pins of the links.

4. Link conveyor according to claim 1, where the links or the connecting elements display lateral projections for guiding the link conveyor in corresponding guide rails.

5. Link conveyor according to claim 1, where the underside of some links is provided with a tooth structure, oriented transversely to the direction of circulation, for engaging a complementary tooth structure of a driving mechanism, where the tooth structure of the link extends over the area below the channel.

6. Link for a link conveyor, with a longitudinal extension and a transverse extension, containing a channel for receiving distribution lines that extends in the longitudinal direction, and
    laterally next to the channel, a guide groove, open towards the top and extending in the longitudinal direction, for sliding reception of an energy guiding chain, as well as hinge pins or hinge mounts, extending in the transverse direction on both sides, for articulated connection to at least two further links, and
    where the underside of the link displays a tooth structure extending in the transverse direction below the channel.

7. Link according to claim 6, where the upper side displays a mounting plate for attaching consumers.

8. Link conveyor arrangement, comprising
    a circulating link conveyor having a linear circulating stretch,
    a supporting frame with upper and lower guide rails, in which the linear circulating stretch of the link conveyor is laterally guided,
    deflection rollers, via which the link conveyor can be transferred from the upper guide rail to the lower guide rail,
    an energy guiding chain for supply lines, where one end of the energy guiding chain is located centrally within the circulatory path in rotating fashion and the other end of the energy guiding chain is connected to a link of the link conveyor, via which the link conveyor can be connected to the supply lines,
    where the link conveyor comprises a plurality of links, each of which displays a channel, extending in the direction of circulation of the link conveyor, for receiving distribution lines, and a guide groove, located next to the channel, that is open towards the inside of the circulatory path and in which the lower strand of the energy guiding chain is laterally guided.

9. Link conveyor arrangement according to claim 8, where the side of at least some of the links that faces towards the inside of the circulatory path displays a tooth structure that is oriented transversely to the direction of circulation and extends over the area below the channel.

10. Link conveyor arrangement according to claim 8, where one of the deflection rollers can be driven in rotating fashion.

* * * * *